(12) United States Patent
Kim et al.

(10) Patent No.: US 11,949,746 B2
(45) Date of Patent: Apr. 2, 2024

(54) IOT DEVICE CONNECTED TO SERVER VIA NAT, AND IOT COMMUNICATION METHOD

(71) Applicant: Korea Electronics Technology Institute, Seongnam-si (KR)

(72) Inventors: Seong Yun Kim, Seoul (KR); Seung Myeong Jeong, Uiwang-si (KR); Ji Ho Lee, Seoul (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 13 days.

(21) Appl. No.: 17/609,918

(22) PCT Filed: Nov. 20, 2019

(86) PCT No.: PCT/KR2019/015931
§ 371 (c)(1),
(2) Date: Nov. 9, 2021

(87) PCT Pub. No.: WO2021/095957
PCT Pub. Date: May 20, 2021

(65) Prior Publication Data
US 2022/0232083 A1    Jul. 21, 2022

(30) Foreign Application Priority Data
Nov. 12, 2019    (KR) .................. 10-2019-0144002

(51) Int. Cl.
*H04L 67/145*    (2022.01)
*H04L 61/2553*   (2022.01)
(Continued)

(52) U.S. Cl.
CPC ........ *H04L 67/145* (2013.01); *H04L 61/2553* (2013.01); *H04L 61/256* (2013.01); *H04L 67/12* (2013.01)

(58) Field of Classification Search
CPC . H04L 67/145; H04L 61/2553; H04L 61/256; H04L 67/12
See application file for complete search history.

(56) References Cited

U.S. PATENT DOCUMENTS

2008/0205288 A1* 8/2008 Herzog ............... H04L 61/2553
                                                    370/252
2008/0209068 A1    8/2008 Herzog
(Continued)

FOREIGN PATENT DOCUMENTS

KR    10-2019-0110265 A    9/2019

OTHER PUBLICATIONS

International Search Report dated Jul. 30, 2020, for corresponding International Patent Application No. PCT/KR2019/015931.
(Continued)

*Primary Examiner* — Thu V Nguyen
*Assistant Examiner* — Angela M Widhalm de Rodriguez
(74) *Attorney, Agent, or Firm* — Hauptman Ham, LLP

(57) ABSTRACT

Provided are an IoT device and an IoT communication method. The IoT device may: be connected to a server via NAT; execute a first session for service connection; and execute a second session for calculating a particular keep-alive value corresponding to a period in which an IP address mapped by the NAT expires. The present invention can minimize transmission of a keep-alive value of an IoT device, enables an IoT device to share a particular keep-alive value with other IoT devices, and thus can minimize a network load which may be caused by a keep-alive value of an IoT communication device.

4 Claims, 9 Drawing Sheets

(51) Int. Cl.
    *H04L 61/256*    (2022.01)
    *H04L 67/12*    (2022.01)

(56) References Cited

U.S. PATENT DOCUMENTS

2013/0054762 A1    2/2013    Asveren
2017/0332318 A1    11/2017    Vyas et al.
2019/0297574 A1*    9/2019    Choi ................ H04W 52/0222

OTHER PUBLICATIONS

Written Opinion dated Jul. 30, 2020, for corresponding International Patent Application No. PCT/KR2019/015931.
Korean Office Action dated Dec. 17, 2020, for corresponding Korean Patent Application No. 10-2019-0144002, with English Translation.

* cited by examiner

IOT DEVICE CONNECTED TO SERVER VIA NAT, AND IOT COMMUNICATION METHOD

CROSS-REFERENCE TO RELATED APPLICATION

The present application is a national stage filing under 35 U.S.C § 371 of PCT application number PCT/KR2019/015931 filed on Nov. 20, 2019, which is based upon and claims the benefit of priorities to Korean Patent Application No. 10-2019-0144002 filed on Nov. 12, 2019, in the Korean Intellectual Property Office, which are incorporated herein in their entireties by reference.

TECHNICAL FIELD

On The present disclosure relates to an Internet of Things (IoT) device and an IoT communication method, and more particularly, to an IoT device connected with a server via a network address translation (NAT), and an IoT communication method.

BACKGROUND ART

Contents described in this part are just to provide background information regarding present embodiments, and do not constitute related-art technology.

A network address translation (NAT) refers to network equipment (for example, a router) that interconnects Internet of Things (IoT) devices and a server, and processes mapping of a public IP and a private IP and traffic routing.

The IoT devices continuously transmit keep alive values in order to be controlled by the server all the time, and continue refining the public IP, private IP mapping expiration time.

However, since IP address mapping expiration times of NAT devices are different and are not standardized, there is no way of knowing IP address mapping expiration times. In addition, there is no way of knowing how many NAT devices exist in an IoT communication environment.

The IoT devices do not know mapping expiration times and thus maintain a connection state by continuously transmitting keep alive values to the server at very short intervals. Accordingly, there may be problems of a network load, a device power load, a server traffic load, etc. in the IoT communication environment where IoT device are gathered.

To solve these problems, there is a demand for a method for IoT devices to transmit keep alive values a minimum number of times.

DISCLOSURE

Technical Problem

The present disclosure has been developed in order to address the above-discussed deficiencies of the prior art, and an object of the present disclosure is to provide an IoT device which is connected with a server via a NAT, and executes a first session for service connection and executes a second session for calculating a specific keep alive value corresponding to a period in which an IP address mapped by the NAT expires, and an IoT communication method.

The technical objects to be achieved by the present disclosure are not limited to those mentioned above, and other technical objects that are not mentioned above may be clearly understood to those skilled in the art based on the description provided below.

Technical Solution

According to an embodiment of the present disclosure to achieve the above-described objects, an Internet of things (IoT) device connected with a server via a network address translation (NAT) includes: a communication unit configured to connect to the server via the NAT; and a controller configured to execute a first session for service connection, and to execute a second session for calculating a specific keep alive value corresponding to a period in which an IP address mapped by the NAT expires.

The controller may calculate the specific keep alive value corresponding to the period in which the IP address mapped by the NAT expires, by: controlling the communication unit to transmit a first time value to the server in the second session; identifying whether a response is received from the server after a time corresponding to the first time value is elapsed; when the response is received, increasing the first time value by a unit time and iteratively retransmitting the increased first time value to the server; when the response is not received, setting a time value which is the unit time subtracted from the corresponding first time value as a specific keep alive value of the first session; and finishing the second session.

In addition, the controller may transmit a connection IP address, connection environment information, device information for calculating a specific keep alive value, and the calculated specific keep alive value to the server.

In addition, when the communication connects to a new network, the controller may identify whether a specific keep alive value corresponding to the corresponding network environment is stored in the server; and, when the specific keep alive value is stored, the controller may set the communication unit to communicate with the corresponding specific keep alive value.

In addition, when the specific keep alive value corresponding to the corresponding network environment is not stored in the server, the controller may calculate the specific keep alive value corresponding to the period in which the IP address mapped by the NAT expires, by: controlling the communication unit to transmit the first time value to the server in the second session; identifying whether a response is received from the server after a time corresponding to the first time value is elapsed; when the response is received, increasing the first time value by the unit time and iteratively retransmitting the increased first time value to the server; when the response is not received, setting the time value which is the unit time subtracted from the corresponding first time value as the specific keep alive value of the first session; and finishing the second session.

In addition, in an environment where a framework for running a plurality of applications is installed, the controller may store a connection IP address, connection environment information, device information for calculating a specific keep alive value, and the calculated specific keep alive value in the framework.

In addition, when an application running in the framework is newly executed, the controller may control to communicate with the corresponding specific keep alive value stored in the framework.

According to an embodiment of the present disclosure, an Internet of things (IoT) communication method by an IoT device connected with a server via a network address translation (NAT) includes: connecting to the server via the NAT; executing a first session for service connection; and executing a second session for calculating a specific keep alive value corresponding to a period in which an IP address mapped by the NAT expires.

Advantageous Effects

According to various embodiments of the present disclosure, there are provided an IoT device which is connected with a server via NAT, and executes a first session for service connection and executes a second session for calculating a specific keep alive value corresponding to a period in which an IP address mapped by the NAT expires, and an IoT communication method, and accordingly, transmission of a keep alive value by the IoT device can be minimized, and a specific keep alive value can be shared with other IoT devices, so that a network load caused by a keep alive value of the IoT device can be minimized.

The effect achieved by the present disclosure is not limited to that mentioned above, and other effects that are not mentioned above may be clearly understood to those skilled in the art based on the description provided below.

DESCRIPTION OF DRAWINGS

The accompanying drawings included as part of detailed descriptions to assist understanding of the present disclosure provide embodiments of the present disclosure, and describe technical features of the present disclosure along with detailed descriptions.

BEST MODE

Figure 1:
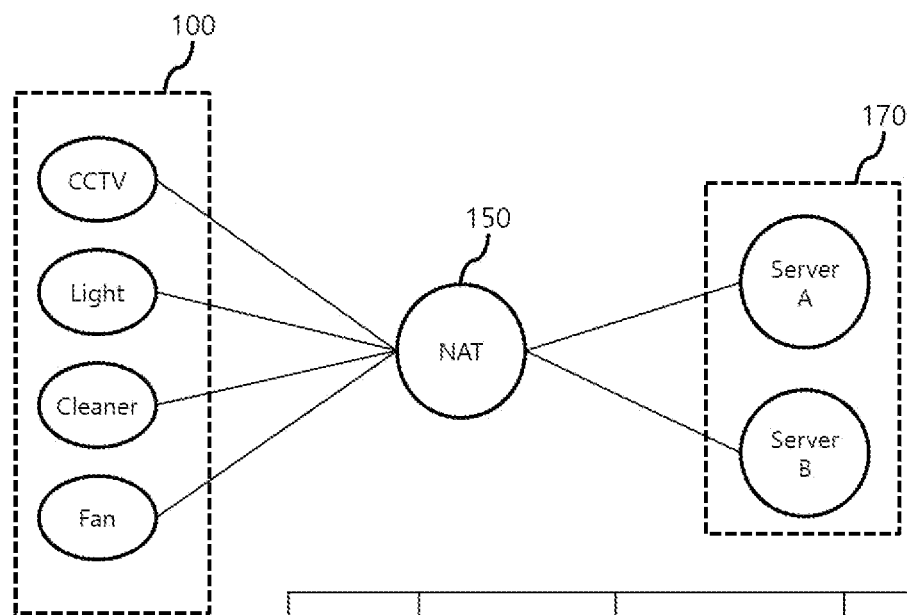
FIG. 1 is a view illustrating an IoT network environment according to an embodiment of the present disclosure.

The present disclosure will now be described more fully with reference to specific embodiments illustrated in the accompanying drawings to clarify features and advantages of the technical solving means of the present disclosure.

However, in the following descriptions and the accompanying drawings, detailed explanations of well-known functions or constructions are omitted since they would obscure the inventive concept of the present disclosure. In addition, it should be noted that, throughout the drawings, the same reference numerals are used for the same elements if possible.

The terms or words used in the following descriptions and the drawings should not be interpreted as being limited to typical or dictionary meanings, and should be interpreted as meaning and concepts conforming to the technical idea of the present disclosure, based on the principle that inventors can define their invention appropriately with concepts of terms for explaining in the best way.

Accordingly, embodiments disclosed in the detailed descriptions and constructions illustrated in the drawings are merely most preferred embodiments of the present disclosure, and do not represent all of the technical ideas of the present disclosure, and thus it should be understood that there may be various equivalents and modifications that can substitute these at the time of filing of the present application.

In addition, such terms as "1st" and "2nd," or "first" and "second" may be used to explain various components and to simply distinguish a corresponding component from another, and do not limit the components. For example, without departing from the scope of the present disclosure, a second element may be referred to as a first element, and similarly, a first element may be referred to as a second element.

In addition, when an element is referred to as being "connected to" or "accessing" another element, the element may be logically or physically connected or access.

In other words, an element may be directly connected to or access another element, but it should be understood that there may be an intervening element therebetween, or the element may be indirectly connected or access.

It should be understood that the terms "include" or "have" used in the detailed descriptions indicate existence of features, numbers, steps, operations, components, parts or a combination thereof described in the detailed descriptions, and do not preclude the presence or addition of one or more other features, numbers, steps, operations, components, parts or combinations thereof.

In addition, the terms "unit" and "module" and the terms having suffix "-er" or "-or" used in the detailed descriptions refer to a unit for processing at least one function or operation, and may be implemented by hardware, software, or a combination of hardware and software.

In addition, terms "a (an)", "one", "the" and similar terms are intended to include both the singular forms and the plural forms, unless the context describing the present disclosure (particularly, the context of the claims) clearly indicates otherwise or the meanings are clearly contradicted by the context.

Hereinafter, the present disclosure will be described in more detail with reference to the drawings.

FIG. 1 is a view illustrating an Internet of Things (IoT) network environment according to an embodiment of the present disclosure. As shown in FIG. 1, the IoT network may include an IoT device 100 and a NAT 150, which are connected servers 170 for an IoT service.

The IoT device 100 is a device that is controlled through IoT communication, and for example, may include a closed-circuit television (CCTV), a light, a cleaner, and a fan which are controllable through IoT communication. One IoT network may include a plurality of IoT devices 100.

The NAT 150 refers to network equipment that interconnects the IoT device 100 and the server 170, and processes mapping of a public IP and a private IP and traffic routing.

For example, the NAT 150 may correspond to a device such as a router. One IoT network may include a plurality of NATs 150.

The server 170 is connected with a user's mobile device or a personal computer (PC), and performs a function of providing a user with an IoT service for controlling the IoT device 100.

In the IoT network environment described above, the IoT devices 100 continuously transmits keep alive values in order to be controlled by the server all the time, and may continue refining a public IP, a private IP, and a mapping expiration time.

Specifically, a NAT mapping table shown in FIG. 1 contains a public IP, a private IP, and a mapping expiration time allocated to each IoT device 100. In addition, it can be seen that the mapping expiration time varies according to the IoT device 100.

The IoT network environment shown in FIG. 1 may include various environments, and for example, one house may be one IoT network environment or one vehicle may be one IoT network environment.

Figure 2:
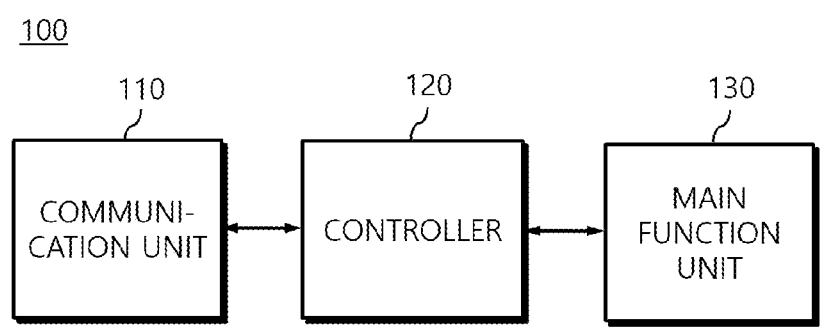
FIG. 2 is a block diagram illustrating a configuration of an IoT device according to an embodiment of the present disclosure.

FIG. 2 is a block diagram illustrating a configuration of an IoT device 100 according to an embodiment of the present disclosure. As shown in FIG. 2, the IoT device 100 includes a communication unit 110, a controller 120, and a main function unit 130.

The main function unit 130 performs an original function of the IoT device 100. For example, when the IoT device 100 is a CCTV, the main function unit 130 may perform a function of the CCTV, and, when the IoT device 100 is a light, the main function unit 130 may perform a function of the light.

The communication unit 110 is connected with the external server 170 via the NAT 150 to be able to perform IoT communication. The communication unit 110 may perform communication in various wireless communication methods such as Bluetooth, WiFi, near field communication (NFC), cellular, long-term evolution (LTE) for IoT communication, or may perform communication through wired communication.

Figure 3:
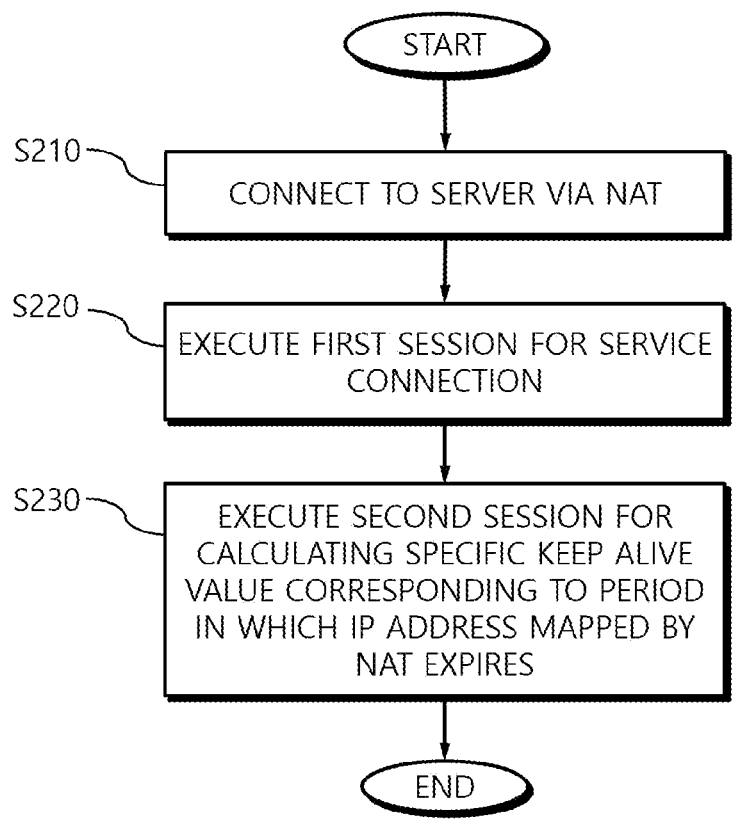
FIG. 3 is a flowchart illustrating a process of an IoT communication method according to an embodiment of the present disclosure.

The controller 120 controls overall functions of the IoT device 100. A specific function will be described below with reference to FIG. 3. FIG. 3 is a flowchart illustrating a process of an IoT communication method according to an embodiment of the present disclosure.

First, the controller 120 controls the communication unit 110 to be connected with the server 170 via the NAT 150 (S210).

In addition, the controller 120 executes a first session for service connection (S220). Herein, the first session indicates an IoT communication session for performing the original function or service of the IoT device 100. Accordingly, the controller 120 may continuously execute the first session while the IoT device 100 is being operated.

In addition, the controller 120 executes a second session for calculating a specific keep alive value corresponding to a period in which an IP address mapped by the NAT expires (S230). When calculation of the specific keep alive value is completed, the controller 120 may change a keep alive value of the first session to the calculated keep alive value, and may finish the second session.

Herein, the keep alive value is a time interval value of a message that is exchanged between the IoT device 100 and the server 170 to identify whether a data link between the IoT device 100 and the server 170 is well operated or to prevent disconnection of the data link. For example, when the keep alive value is 10 seconds, the IoT device 100 may transmit the keep alive message to the server 170, and, after 10 seconds are elapsed, the server 170 may transmit a response to the keep alive message to the IoT device 100. When the IoT device 100 receives the response to the keep alive message from the server 170, the IoT device 100 may determine that there is no problem in communication, and, when the response is not received, the IoT device 100 may determine that there is a problem in communication.

In addition, the specific keep alive value indicates a time value corresponding to a period in which an IP address mapped by the NAT expires, and corresponds to a maximum value of a time during which the IP address is maintained without being changed.

Figure 4:
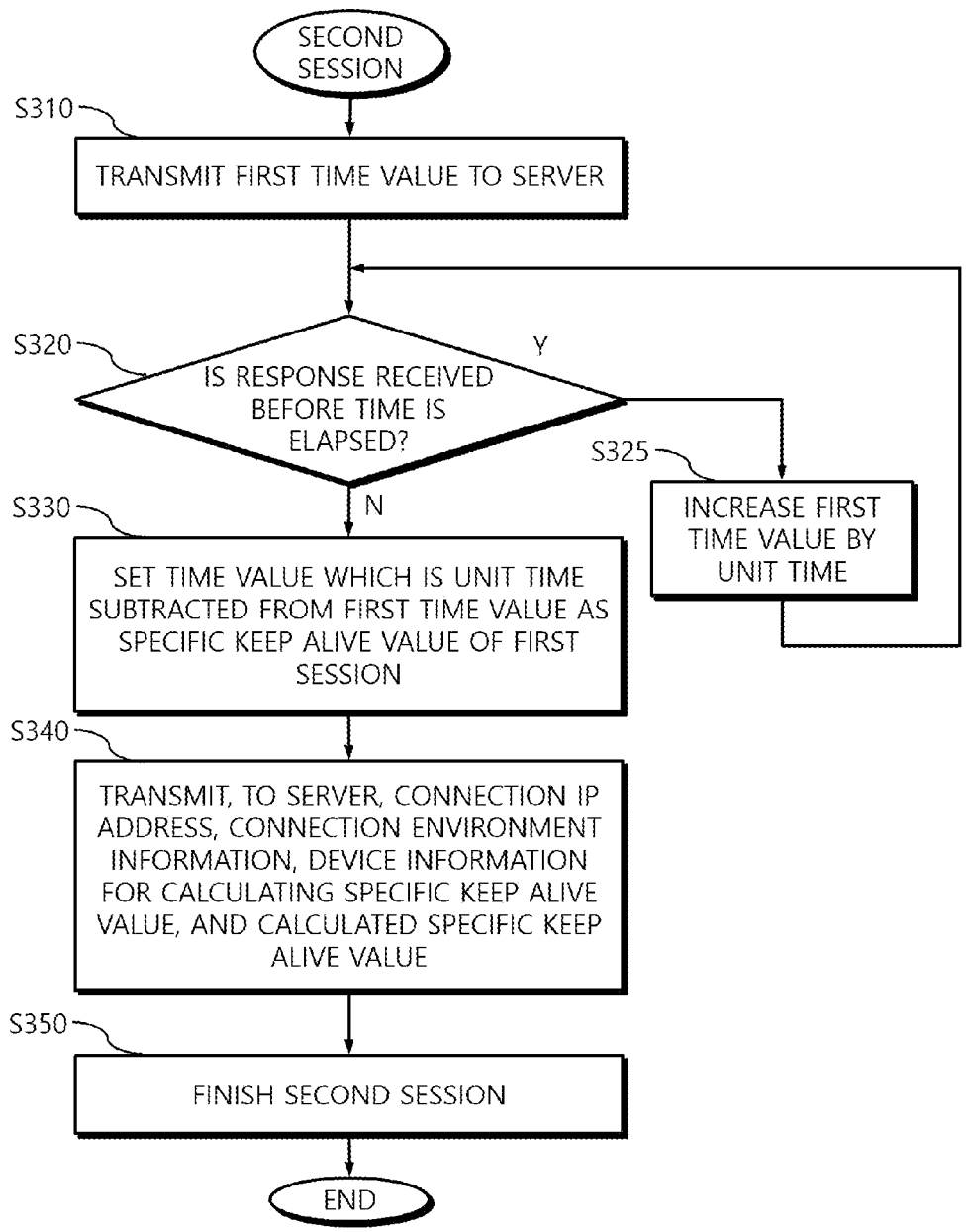
FIG. 4 is a flowchart illustrating a process of calculating a specific keep alive value according to an embodiment of the present disclosure.

A process of the controller 120 calculating a specific keep alive value will be described in more detail with reference to FIG. 4. FIG. 4 is a flowchart illustrating a process of calculating a specific keep alive value according to an embodiment of the present disclosure.

First, the controller 120 controls the communication unit 110 to transmit a first time value to the server 170 in the second session (S310). Then, the server 170 transmits a response to the IoT device 100 after a time corresponding to the received first time value.

The controller 120 identifies whether the response is received from the server 170 after the time corresponding to the first time value is elapsed (S320).

When the response is received (S320-Y), the controller 120 increases the first time value by a unit time, and re-transmits the increased first time value to the server 170, and resumes step S320 (S325). Since the response being received implies that the IP address does not expire and there is no problem in communication, the process may be tried again with an extended time value.

When the response is not received (S320-N), the controller 120 sets a time value which is the unit time subtracted from the corresponding first time value to a specific keep alive value of the first session (S330). The response may not be received when the first time value is longer than the period in which the IP address mapped by the NAT expires. Since the IP address of the IoT device 100 is changed but the changed IP address information is not transmitted to the server 170, the controller 120 may fail to receive the response. Accordingly, it can be seen that the first time value before being increased by the unit time is a time value corresponding to the period in which the IP address mapped by the NAT expires.

Thereafter, the controller 120 transmits, to the server 170, a connection IP address, connection environment information, device information for calculating a specific keep alive value, and the calculated specific keep alive value (S340). The connection IP address indicates the public IP and the private IP of the corresponding IoT device 100, the connection environment information indicates information regarding the NAT, information regarding a communication method, and the device information for calculating the specific keep alive value indicates MAC address information or serial number of the IoT device 100.

In addition, the controller 120 finishes the second session (S350).

Through the above-described process, the controller 120 may calculate the specific keep alive value corresponding to the period in which the IP address mapped by the NAT expires.

Figure 5:
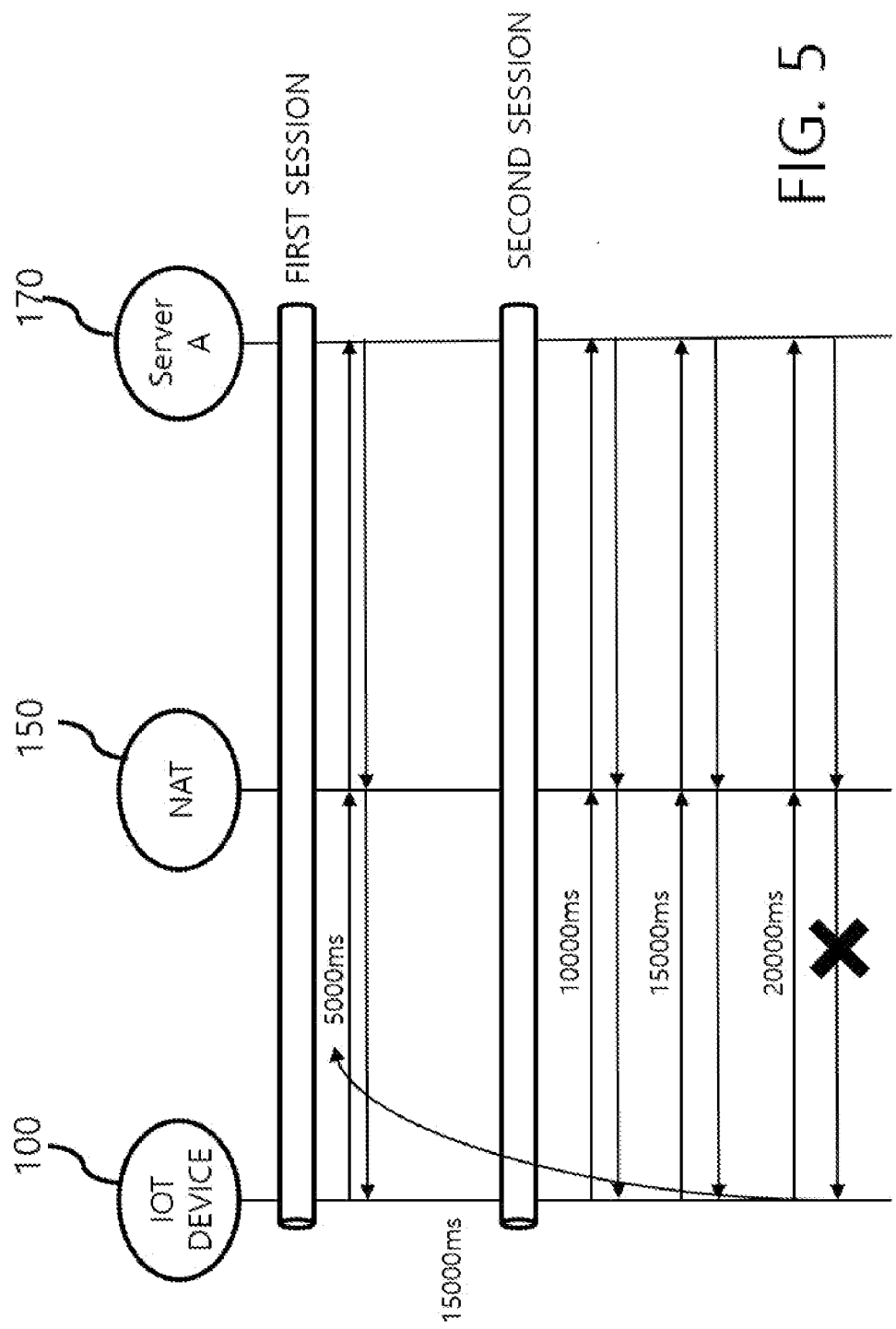
FIG. 5 is a view illustrating an example of a process of calculating a specific keep alive value according to an embodiment of the present disclosure.

FIG. 5 is a view illustrating an example of a process of calculating a specific keep alive value according to an embodiment of the present disclosure.

In FIG. 5, the first session is a session for the IoT device 100 to provide an IoT service, and the keep alive value is 5000 ms.

In addition, the second session is a session for calculating a specific keep alive value corresponding to a period in which an IP address mapped by the NAT expires. In the second session, the IoT device 100 transmits a first time value of 10000 ms to the server 170, and succeeds in receiving a response from the server 170 after 10000 ms.

Thereafter, the IoT device 100 increases the first time value by a unit time, 5000 ms, and transmits the first time value of 15000 ms to the server 170, and succeeds in receiving a response from the server 170 after 15000 ms.

Next, the IoT device 100 additionally increases the first time value by the unit time, 5000 ms, and transmits the first time value of 20000 ms to the server 170, and fails to receive a response from the server 170 after 20000 ms.

Accordingly, the IoT device 100 may calculate 15000 ms, which is the first time value before the corresponding first time value of 20000 ms increases, as a specific keep alive value corresponding to the period in which the IP address mapped by the NAT expires, by subtracting the unit time of 5000 ms from the first time value of 20000 ms. That is, the specific keep alive value is 15000 ms.

The controller 120 of the IoT device 100 changes the keep alive value of the first session to the specific keep alive value, 15000 ms.

Figure 6:
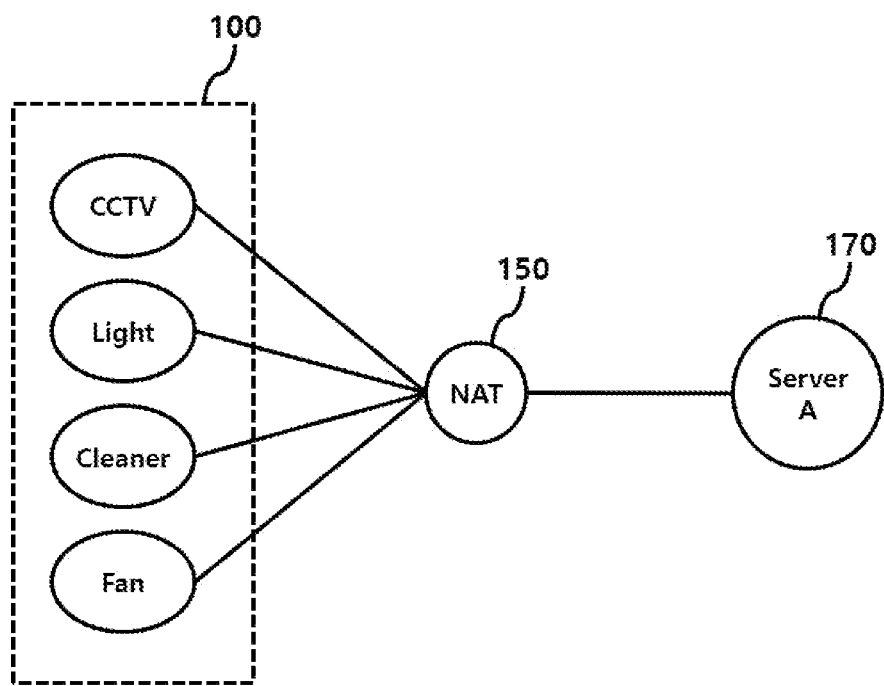
FIG. 6 is a view illustrating an IoT network environment in which a specific keep alive value is shared through a server according to an embodiment of the present disclosure.

FIG. 6 is a view illustrating an IoT network environment in which a specific keep alive value is shared through a server according to an embodiment of the present disclosure.

As shown in FIG. 6, the IoT network includes an IoT device 100 and a NAT 150, which are connected to a server 170 for an IoT service.

The IoT device 100 indicates a device that is controlled through IoT communication, and for example, it is illustrated in FIG. 6 that the IoT device includes a CCTV, a light, a cleaner, a fan. One IoT network may include a plurality of IoT devices 100.

Figure 7:
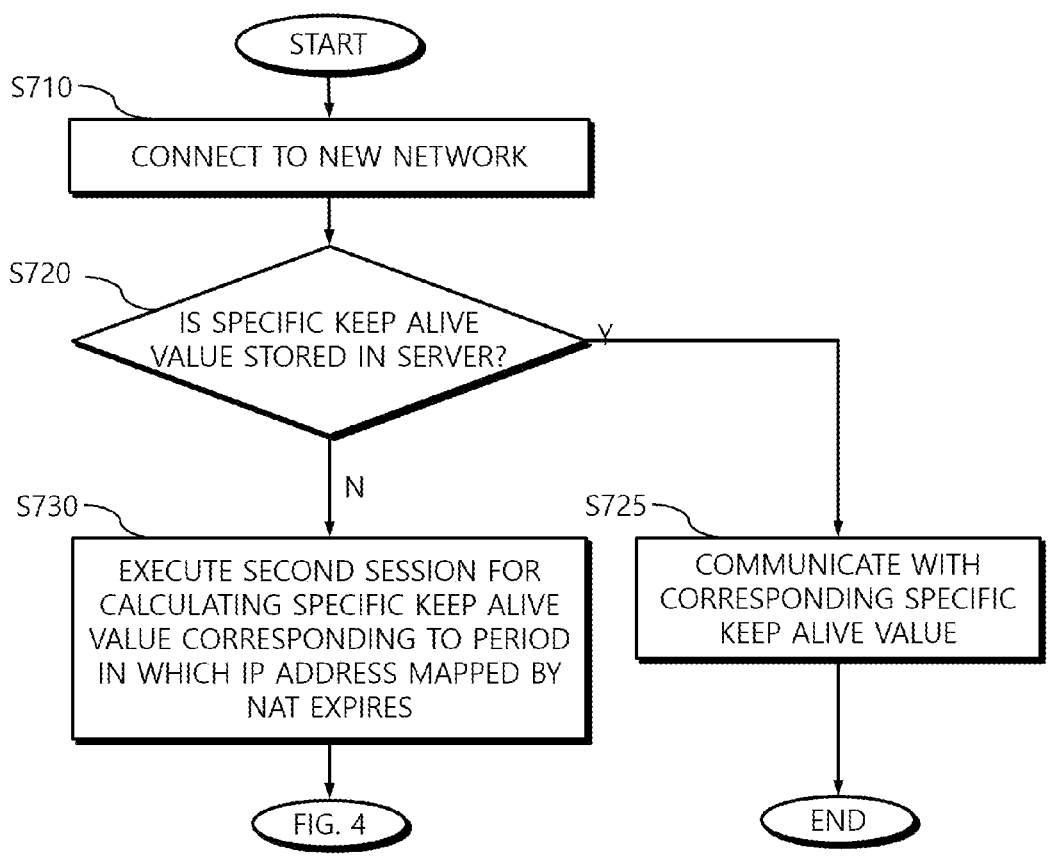
FIG. 7 is a flowchart illustrating a process of sharing a specific keep alive value through a server according to an embodiment of the present disclosure.

FIG. 7 is a flowchart illustrating a process of sharing a specific keep alive value through a server according to an embodiment of the present disclosure.

When the communication unit 110 connects to a new network (S710), the controller 120 of the IoT device 100 identifies whether a specific keep alive value corresponding to the corresponding network environment is stored in the server 170 (S720).

When the specific keep alive value is stored (S720-Y), the controller 120 sets the communication unit 110 to communicate with the corresponding specific keep alive value (S725).

On the other hand, when the specific keep alive value corresponding to the corresponding network environment is not stored in the server 170 (S720-N), the controller 120 executes the second session for calculating a specific keep alive value corresponding to a period in which an IP address mapped by the NAT expires (S730). The second session process is as shown in FIG. 4.

Through the above-described process, the IoT device 100 may share the specific keep alive value through the server 170.

Figure 8:
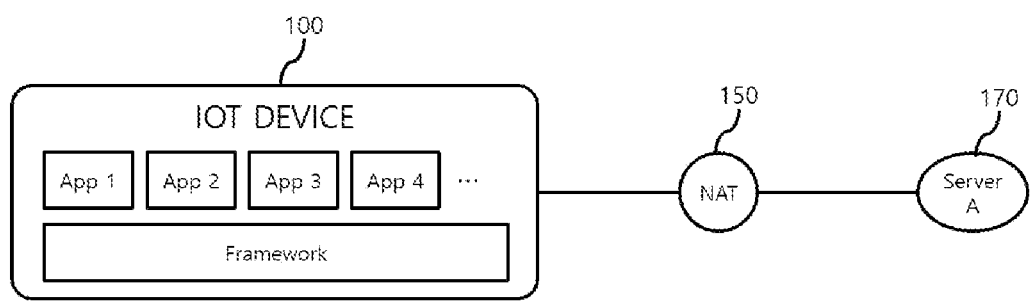
FIG. 8 is a view illustrating an IoT network environment in which a specific keep alive value is shared through a framework according to an embodiment of the present disclosure.

FIG. 8 is a view illustrating an IoT network environment in which a specific keep alive value is shared through a framework according to an embodiment of the present disclosure.

As shown in FIG. 8, the IoT network includes an IoT device 100 and a NAT 150, which are connected to a server 170 for an IoT service.

The IoT device 100 has a framework installed therein to run a plurality of applications. Specifically, the IoT device 100 shown in FIG. 8 includes a framework for running four applications, App 1, App 2, App 3, App 4.

When the framework for running the plurality of applications is installed in the IoT device 100 as described above, the controller 120 may store a connection IP address, connection environment information, device information for calculating a specific keep alive value, and the calculated specific keep alive value in the framework.

Figure 9:
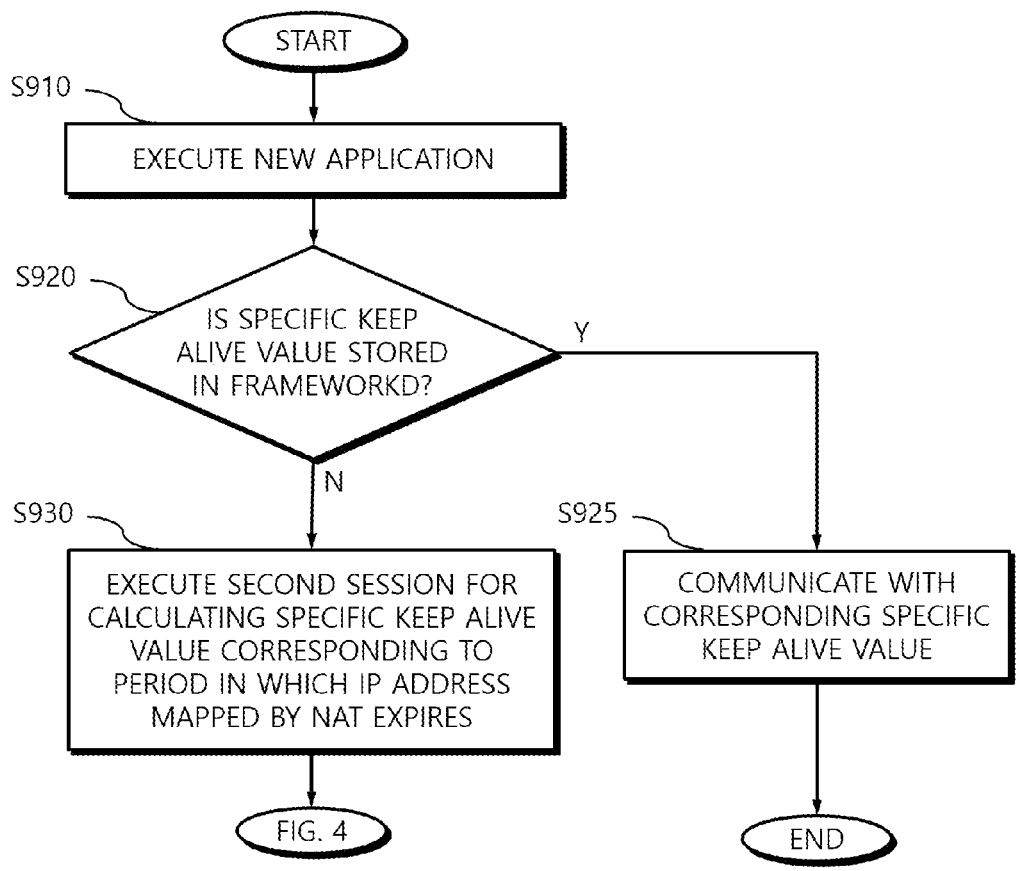
FIG. 9 is a flowchart illustrating a process of sharing a specific keep alive value through a framework according to an embodiment of the present disclosure.

FIG. 9 is a flowchart illustrating a process of sharing a specific keep alive value through a framework according to an embodiment of the present disclosure.

When an application running in the framework is newly executed (S910), the controller 120 of the IoT device 100 identifies whether a specific keep alive value corresponding to the corresponding network environment is stored in the framework 170 (S920).

When the specific keep alive value is stored (S920-Y), the controller 120 sets the communication unit 110 to communicate with the corresponding specific keep alive value stored in the framework (S925).

On the other hand, when the specific keep alive value corresponding to the corresponding network environment is not stored in the framework (S920-N), the controller 120 executes the second session for calculating a specific keep alive value corresponding to a period in which an IP address mapped by the NAT expires (S930). The second session process described above is as shown in FIG. 4.

Through the above-described process, the IoT device 100 may share the specific keep alive value through the framework.

The technical concept of the present disclosure may be applied to a computer-readable recording medium which records a computer program for performing functions of the apparatus and the method according to the present embodiment. In addition, the technical concept according to various embodiments of the present disclosure may be implemented in the form of a computer-readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, a flash memory, a solid state disk (SSD) or the like. A computer-readable code or program that is stored in the computer readable recording medium may be transmitted via a network connected between computers.

Although an exemplary device configuration is described in the detailed descriptions and the drawings, the functional operations and the subject described in the detailed descriptions may be implemented by other types of digital electronic circuits, or may be implemented by computer software, firmware or hardware including the structure disclosed in the detailed descriptions and its structural equivalent, or a combination of one or more of these.

Accordingly, the present disclosure has been described in detail with reference to the above-described examples, but alternations, changes, and modifications can be made to the examples by those skilled in the related art without departing from the scope of the present disclosure.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical concept or prospect of the present disclosure.

The invention claimed is:

1. An Internet of things (IoT) device connected with a server via a network address translation (NAT), the IoT device comprising:
   a communication unit configured to connect to the server via the NAT; and
   a controller configured to execute a first session for service connection,
   when the communication unit connects to a new network, identify whether a specific keep alive value corresponding to a corresponding network environment is stored in the server,
   when the specific keep alive value is stored, set the communication unit to communicate with the corresponding specific keep alive value, and
   when the specific keep alive value is not stored in the server, execute a second session for calculating a specific keep alive value corresponding to a period in which an IP address mapped by the NAT expires, by:
      controlling the communication unit to transmit a first time value to the server in the second session;
      identifying whether a response is received from the server after a time corresponding to the first time value is elapsed;
      when the response is received, increasing the first time value by a unit time and iteratively retransmitting the increased first time value to the server;
      when the response is not received, setting a time value which is the unit time subtracted from the corresponding first time value as a specific keep alive value of the first session; and
      finishing the second session, and
   wherein the controller is configured to transmit a connection IP address, connection environment information, device information for calculating the specific keep alive value, and the calculated specific keep alive value to the server,
   wherein the specific keep alive value corresponds to a maximum value of a time during which the IP address is maintained without being changed.

2. The IoT device of claim 1, wherein, in an environment where a framework for running a plurality of applications is installed, the controller is configured to store a connection IP address, connection environment information, device information for calculating a specific keep alive value, and the calculated specific keep alive value in the framework.

3. The IoT device of claim 2, wherein, when an application running in the framework is newly executed, the controller is configured to control to communicate with the corresponding specific keep alive value stored in the framework.

4. An Internet of things (IoT) communication method by an IoT device connected with a server via a network address translation (NAT), the method comprising:
   connecting to the server via the NAT;
   executing a first session for service connection;
   when a communication unit connects to a new network, identifying whether a specific keep alive value corresponding to a corresponding network environment is stored in the server;
   when the specific keep alive value is stored, setting the communication unit to communicate with the corresponding specific keep alive value;
   when the specific keep alive value is not stored in the server, executing a second session for calculating a specific keep alive value corresponding to a period in which an IP address mapped by the NAT expires;
   controlling the communication unit to transmit a first time value to the server in the second session;
   identifying whether a response is received from the server after a time corresponding to the first time value is elapsed;
   when the response is received, increasing the first time value by a unit time and iteratively retransmitting the increased first time value to the server;
   when the response is not received, setting a time value which is the unit time subtracted from the corresponding first time value as a specific keep alive value of the first session;
   finishing the second session; and
   transmitting a connection IP address, connection environment information, device information for calculating the specific keep alive value, and the calculated specific keep alive value to the server,
   wherein the specific keep alive value corresponds to a maximum value of a time during which the IP address is maintained without being changed.

* * * * *